UNITED STATES PATENT OFFICE.

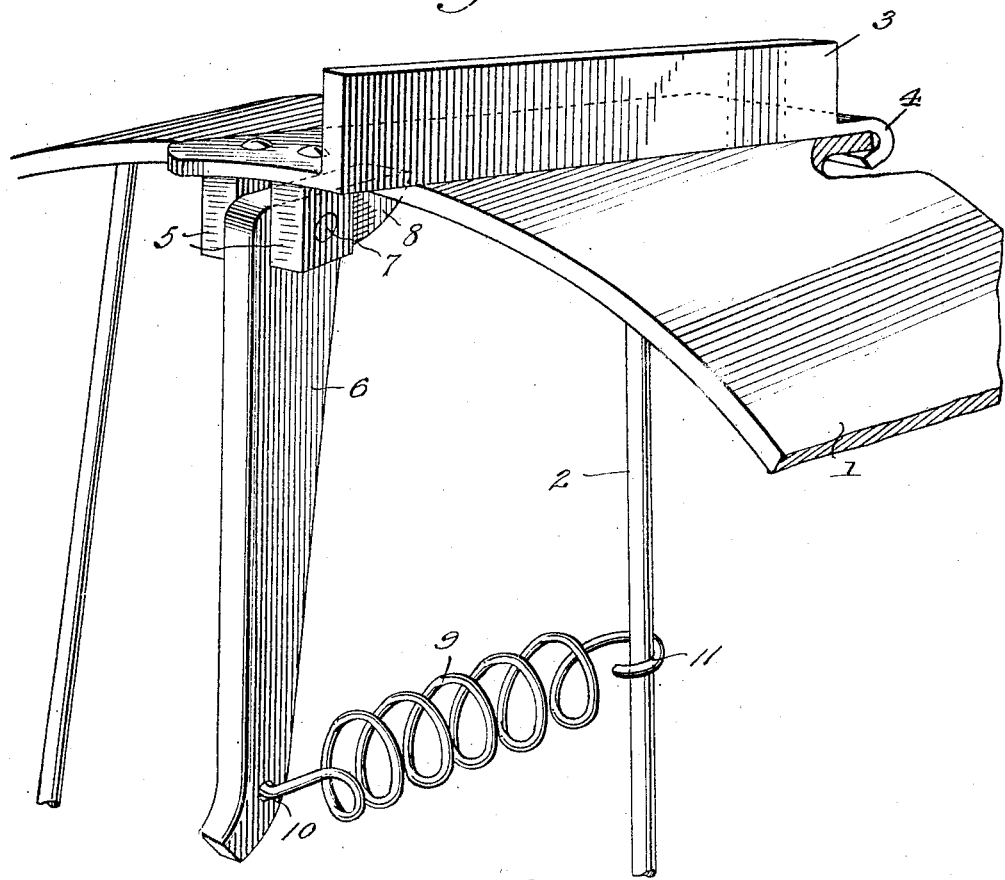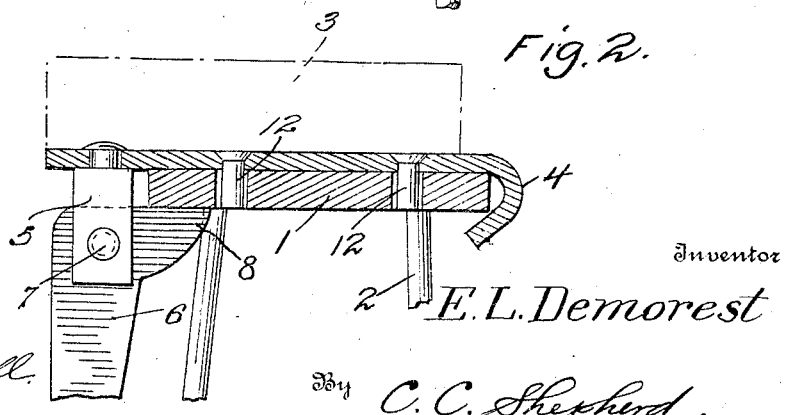

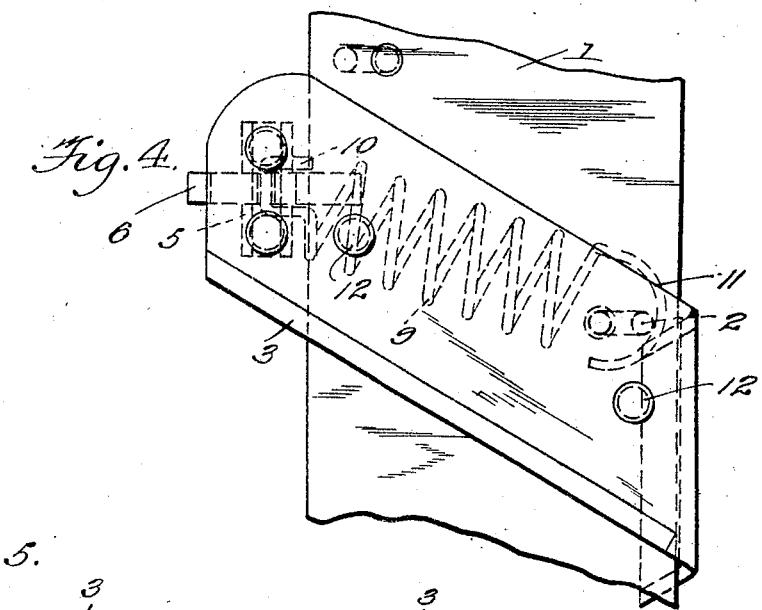

EDMURN L. DEMOREST, OF COLUMBUS, OHIO, ASSIGNOR TO JAMES ELLWOOD JONES, OF SWITCHBACK, WEST VIRGINIA.

TRACTOR-CLEAT.

1,380,366.  Specification of Letters Patent.  Patented June 7, 1921.

Application filed September 6, 1918. Serial No. 252,828.

*To all whom it may concern:*

Be it known that I, EDMURN L. DEMOREST, a citizen of the United States, residing at Columbus, in the county of Franklin and State of Ohio, have invented certain new and useful Improvements in Tractor-Cleats, of which the following is a specification.

This invention relates to tractor cleats designed to be quickly applied to the wheel of the tractor or similar motor vehicle to materially enhance the tractive effort thereof. Specifically, my invention is designed to be applied to a tractor wheel to give it the desired ground grip to pull the necessary number of plows through the field without permitting the wheels to slip.

With this end in view, the main object of my invention resides in a structure whereby the cleat is held against circumferential movement and is also locked against radial displacement and may be applied or removed in a minimum of time. I am well aware of the fact that detachable cleats in themselves are not broadly new but the time element involved in applying and removing these cleats has always been a source of considerable trouble.

With these and other objects of similar nature in view, my invention consists in the structure shown in the accompanying sheets of drawings which represent the preferred embodiment of the invention. In these drawings, similar characters of reference designate corresponding parts throughout and Figure 1 is a fragmentary view in perspective of a wheel rim showing my detachable cleat in its applied position.

Fig. 2 is a fragmentary section of the left hand end of the cleat as shown in Fig. 1, Fig. 3 shows the cleat in its applied position in connection with a wheel rim shown in cross section.

Fig. 4 is a top plan view of the structure shown in Fig. 3, and

Fig. 5 is a side elevation of the structure shown in Fig. 3.

It will be understood that my invention is not specifically limited to tractor wheels although that is primarily its purpose and it has therefore been illustrated in connection with a tractor wheel, the rim of which is designated by the reference numeral 1 and the spokes by the reference numeral 2.

The cleat is designed to fit across the face of the wheel preferably on an angle as is illustrated and the cleat itself is formed of an angle iron member 3. The right hand end of this angle iron has its upstanding leg cut away sufficiently to permit the horizontal leg to be bent to hook form as illustrated at 4 to embrace one edge of the wheel rim. At its opposite end, this angle iron cleat carries a pair of depending lugs 5 between which the bell crank 6 is pivoted at the point indicated by the reference numeral 7. The short arm 8 of this bell crank is formed and likewise the pivot point 7 is so located as to permit the short arm to engage the under surface of the wheel rim as is illustrated particularly clearly in Figs. 2 and 3. Thus, when the hooked end 4 is made to embrace a wheel rim at one edge and the short arm 8 of the bell crank 6 is caused to bear against the under surface of the wheel rim at the opposite end of the cleat member, the cleat itself is firmly held against radial displacement. Readily applicable means for holding the bell crank in its properly applied position is illustrated in the form of a coil spring 9, one end of this coil spring engaging the bell crank as shown at 10 and the opposite end being hooked about one of the spokes of the wheel as illustrated at 11. By the use of a spring, the parts are held firmly in their associated relation and in this manner all rattling noises are eliminated.

To hold the cleat against circumferential displacement, I have provided a horizontal leg of the cleat member with a pair of depending studs 12, these studs being adapted to seat themselves in apertures in the wheel rim. It will of course be understood that the apertures in which these studs fit will of necessity have to be properly spaced and located but when this is done, the cleats themselves are firmly held against circumferential displacement after they have been applied and locked against radial displacement.

From the foregoing description, taken in connection with the accompanying sheets of drawings, it will be apparent that I have provided a cleat which may be very quickly applied and likewise very quickly removed. Aside from the increased tractive effort these cleats produce, the time element involved in their application and removal is of greatest importance inasmuch as their use upon improved highways is ruinous to such highways and is not permitted by the authorities in many instances. With my improved cleat, all that is necessary is that the apertures within which the studs 12 fit should be open and after this, the hooked end 4 is made to engage one edge of the wheel rim while the opposite edge is locked against displacement by the clamping action of the bell crank in conjunction with the springs 9. These springs may be permanently affixed at one end to either the bell crank or the spokes as may be desired and all that is necessary to bring the bell crank into locking engagement is that the springs be brought into their associated relation with the remaining parts as is illustrated in Figs. 1 and 3.

What I claim is:

1. In a tractor wheel, a detachable cleat comprising a member capable of extending transversely across the rim of a wheel, said member having one end thereof terminated to grip one edge of the rim, a bell crank lever pivoted to the opposite end of said member in a position so that one arm of said lever will engage the inner surface of the rim, and spring means engaging the other arm of said lever and coöperative with said wheel to frictionally maintain said lever in cleat holding engagement with said rim.

2. In a tractor wheel, a detachable cleat comprising a member fitting across the face of said wheel, a hooked end on one end of said member for engaging the wheel rim, a bell crank pivoted to said member in a position so one arm engages the under surface of the wheel, and spring means for engaging the other arm to hold the bell crank in such applied position.

3. A detachable cleat for tractor wheels comprising a member arranged to be positioned upon the rim of a wheel, means for locking said member against movement on said rim, comprising a hook formed with one end of said member for engaging one of the edges of said rim, and a pivoted lever carried by the other end of said member and coöperative with the other edge of said rim for holding the cleat in locked relationship with said wheel.

4. A detachable cleat for tractor wheels comprising a member arranged to be fitted transversely and angularly across the rim surface of a tractor wheel, a plurality of studs projecting from the under side of said member and arranged to be received within openings formed in said rim, said studs serving to prevent circumferential movement on the part of said member, a hook formed upon one end of said member for engagement with one edge of the rim of said wheel, and a spring actuated lever pivotally carried by the opposite end of said member, said lever serving to retain said studs within said openings and to maintain the engagement between the hooked end of said member and said rim.

5. A detachable cleat for agricultural vehicle wheels, comprising an angle iron member capable of being arranged transversely and angularly across the tread surface of a wheel, a plurality of spaced studs rigidly projecting from the inner surface of said member and arranged to be seated within openings therefor provided in the rim of said wheel, whereby circumferential movement of said cleat upon said wheel will be precluded, a hook formed upon one end of said cleat and arranged for engagement with a coöperative edge of said rim to retain said cleat in position, a bell crank lever pivotally connected to the opposite end of said member, and spring means operating upon said lever to force one of the arms thereof into cleat holding engagement with the inner peripheral surface of said rim.

In testimony whereof I affix my signature.

ED. L. DEMOREST.